(12) United States Patent
Chen

(10) Patent No.: US 6,430,978 B1
(45) Date of Patent: Aug. 13, 2002

(54) STEERING WHEEL Y-LOCK

(76) Inventor: Dennis Quiang Chen, 62-54 97th Pl., Apt.16A, Rego Park, NY (US) 11374

( * ) Notice: Subject to any disclaimer, the term of this patent is extended or adjusted under 35 U.S.C. 154(b) by 0 days.

(21) Appl. No.: 09/883,668

(22) Filed: Jun. 19, 2001

(51) Int. Cl.[7] .............................................. B60R 25/02
(52) U.S. Cl. ........................................ 70/209; 70/226
(58) Field of Search ......................... 70/209, 211, 212, 70/225, 226, 237, 238

(56) References Cited

U.S. PATENT DOCUMENTS

| | | | | |
|---|---|---|---|---|
| 4,913,265 A | * | 4/1990 | Richards | 70/226 X |
| 4,949,561 A | * | 8/1990 | Solow et al. | 70/226 X |
| 5,333,477 A | * | 8/1994 | Davis | 70/226 |
| 5,548,983 A | * | 8/1996 | Hart | 70/226 X |
| 5,595,078 A | | 1/1997 | Harrell | 70/209 |
| 5,613,383 A | * | 3/1997 | Banez | 70/164 X |
| 5,735,149 A | * | 4/1998 | Winner, Jr. | 70/209 |
| 5,755,124 A | * | 5/1998 | Chang | 70/209 |
| 5,855,128 A | * | 1/1999 | Voiculescu | 70/209 |
| 5,887,464 A | | 3/1999 | Perez | 70/209 |
| 5,906,122 A | | 5/1999 | Jinn-Fu | 70/209 |
| D411,821 S | | 7/1999 | Markegard et al. | D12/177 |
| D421,891 S | | 3/2000 | Yang | D8/331 |
| 6,109,076 A | | 8/2000 | Kajuch | 70/209 |
| 6,134,927 A | | 10/2000 | Wu | 70/209 |

\* cited by examiner

*Primary Examiner*—Lloyd A. Gall
(74) *Attorney, Agent, or Firm*—Randal D. Homburg

(57) ABSTRACT

The invention is a device for locked attachment to the steering wheel of an automobile, attaching to the outer perimeter of a steering wheel at three locations relatively equally spaced apart, covering the central portion of the steering wheel to lock the steering wheel in a stationary position to deter theft of the automobile and to prevent theft of the air bag in the steering wheel.

3 Claims, 3 Drawing Sheets

STEERING WHEEL Y-LOCK

NO CROSS REFERENCE TO RELATED APPLICATIONS

BACKGROUND OF THE INVENTION

1. Field of Invention

The invention is a device for locked attachment to the steering wheel of an automobile, attaching to the outer perimeter of a steering wheel at three locations relatively equally spaced apart, covering the central portion of the steering wheel to lock the steering wheel in a stationary position to deter theft of the automobile and to prevent theft of the air bag in the steering wheel.

2. Description of Prior Art

The following United States patents were discovered and are disclosed within this application for utility patent. All relate to steering wheel locks and theft deterring devices. These prior art patents are disclosed as follows:

U.S. Pat. No. 6,134,927 to Wu discloses a steering wheel lock that completely covers the steering wheel of an automobile, the cover having a single U-shaped hook to hook the steering wheel of the automobile at a singular location with the anti-theft rod attaching to the cover through the steering wheel, affixing the device to two locations of the steering wheel. In U.S. Pat. No. 6,109,076 to Kajuch, a another two point automobile and air bag anti-theft device is disclosed, this device attaching a two locations on the inside of the steering wheel partially covering the steering wheel and the central air bag portion of the steering wheel. The steering wheel is captured within and between an upper plate, a lower plate and a rim, held together by a keyed padlock with a movement preventing rod attached to the upper plate to prevent rotation of the steering wheel encapsulated within the device, as disclosed in U.S. Pat. No. 5,595,078 to Harrell.

A semi-circular disc is disclosed in U.S. Pat. No. 5,906,122 to Jinn-Fu, the disc having a formed groove with which approximately half of the outer perimeter of the steering wheel is contained and wherein a hooked locking rod is inserted and locked to affix the device on the steering wheel. A compressing two point attaching steering wheel lock is disclosed in U.S. Pat. No. 5,887,464 to Perez, this device having three slidably engaging tubes with a locking rachet and pawl slide rod, compressing the device onto the steering wheel at opposing locations across a diameter of the steering wheel.

Two design patents disclose ornamental designs for two point attaching steering wheel locks, these patents disclosed as U.S. Design Pat. No. D 421,891 to Yang and D 411,821 to Markegard, et al.

SUMMARY OF THE INVENTION

The primary objective of the invention is to provide a steering wheel lock which attaches to a steering wheel of an automobile at three points on the steering wheel, covering the central portion of the steering wheel preventing removal and theft of the air bag in the central portion of the steering wheel and deterring theft of the vehicle by prevention of rotation. A second objective of the device is the provision of a three point attachment providing a more secure and immovable attachment to the steering wheel as opposed to the two point attaching steering wheel covers of the prior art. In addition, the portion of the device in contact with the outer perimeter of the steering wheel is lined with a friction enhancing material to prevent rotational movement or disengagement of the device once attached to the steering wheel.

DESCRIPTION OF THE DRAWINGS

The following drawings are submitted with this utility patent application.

DESCRIPTION OF THE PREFERRED EMBODIMENT

Figure 1:
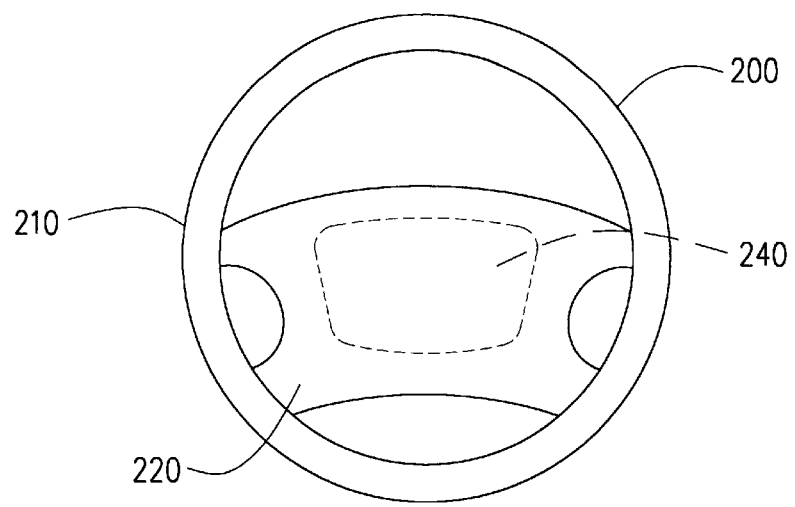
FIG. 1 is a drawing of a steering wheel, showing the center portion containing an airbag.
Figure 2:
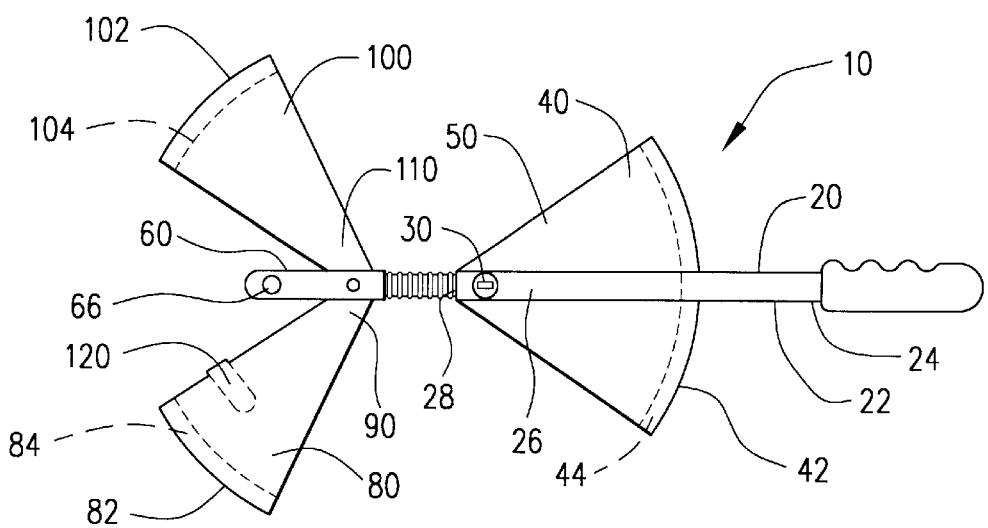
FIG. 2 is a top view of the device in an unlocked position.
Figure 3:
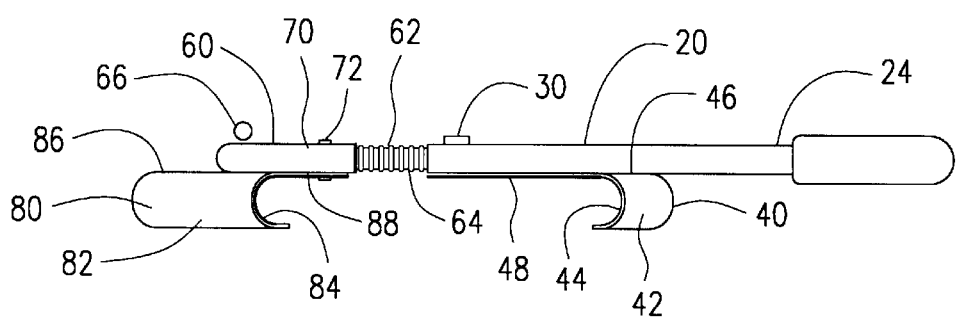
FIG. 3 is a side view of the device in an unlocked position.

The invention, as shown in FIGS. 2–7, is a device 10 for locked attachment to an outer perimeter 210 of an automobile steering wheel 200, as shown in FIG. 1, having a centrally located airbag 240 in a central support 220 of the steering wheel, preventing operation of the vehicle by prohibiting rotation of the steering wheel 200, and disallowing removal of the centrally located airbag 240. The device comprises a first tubular shaft 20 attaching to a first steering wheel engaging fin 40 having a curved hook portion 44, the first tubular shaft 20 having an elongated handle 24, and an inner receiving portion 28 having an internal lock 30, a shortened second tubular shaft 60 having an outer threaded portion 64 slidably engaging the inner receiving portion 28 of the first tubular shaft 20. The second tubular shaft 60 has a pivotally attached second steering wheel engaging fin 80 having a curved hook portion 84 and a pivotally attached third steering wheel fin 100 having a curved hook portion 104, wherein the curved hook portions 44, 84, 104 of the first, second and third steering wheel fins 40, 80, 100 engage the outer perimeter 210 of the automobile steering wheel 200, and are drawn to a secure tight fit on the steering wheel by sliding the second tubular shaft 60 into the first tubular shaft 20 and engaging the internal lock 30.

More specifically, as shown in FIGS. 2–6, the first tubular shaft 20 has a first end 22 having the elongated handle 24 and a second end 26, having the inner receiving portion 28. The first steering wheel engaging fin 40, most preferably, is triangular in shape, having a narrowed end 50 opposing a curved edge 42, the curved edge 42 including the curved hook portion 44 contoured to the relative shape of the outer perimeter 210 of the steering wheel 200. The first steering wheel engaging fin 40 has an upper surface 46 and a lower surface 48, the lower surface 48 being the surface in contact with the steering wheel, and the upper surface 46 permanently attached to the first tubular shaft 20. The first steering wheel engaging fin 40 is oriented to position the curved hook portion 44 towards the first end 22 of the first tubular shaft 20 with the elongated handle 24 of the first tubular shaft 20 projecting at least a foot beyond the first steering wheel engaging fin 40, as shown in FIGS. 2–6 of the drawings.

The second tubular shaft 60, as shown in FIGS. 2–6 of the drawings, has a first end 62, having the outer threaded portion 64, and a second end 66. Located near the first end 62 is a pivot hole 70 containing a pivot rivet 72. The second steering wheel engaging fin 80 and the third steering wheel engaging fin 100 are similar and triangular in shape, having single curved edges 82, 102 including the curved hook portions 84, 104, contoured to the relative shape of the outer perimeter 210 of the steering wheel 200. Each of the second and third steering wheel engaging fins 80, 100 have an upper surface 86, 106 and a lower surface 88, 108, the lower surface 88, 108 being the surface in contact with the steering wheel 200. Each of the second and third steering wheel engaging fins 80, 100 have an angled end 90, 110, opposite the curved hook portion 84, 104. These angled ends 90, 110 are pivotally attached to the second tubular shaft 60 by the pivot rivet 72, with the respective upper surfaces 86, 106 of the second and third steering wheel engaging fins 80, 110 towards the second tubular shaft 60.

Figure 4:
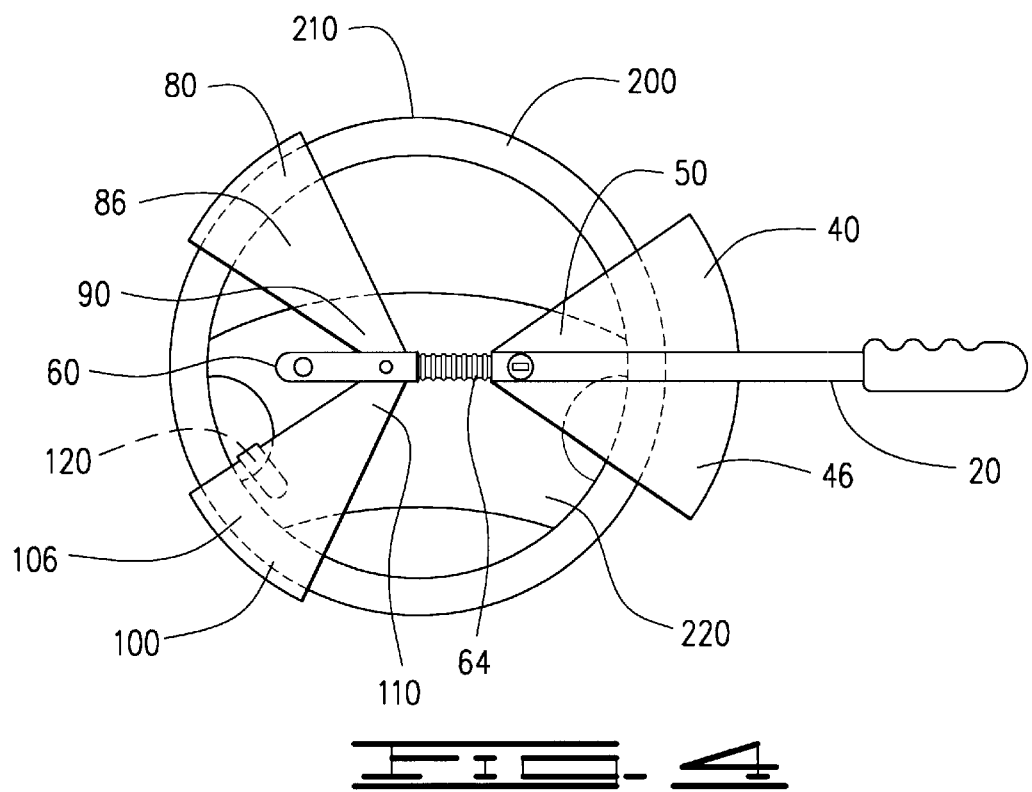
FIG. 4 is a top view of the device in an unlocked position in relation to a steering wheel.
Figure 5:
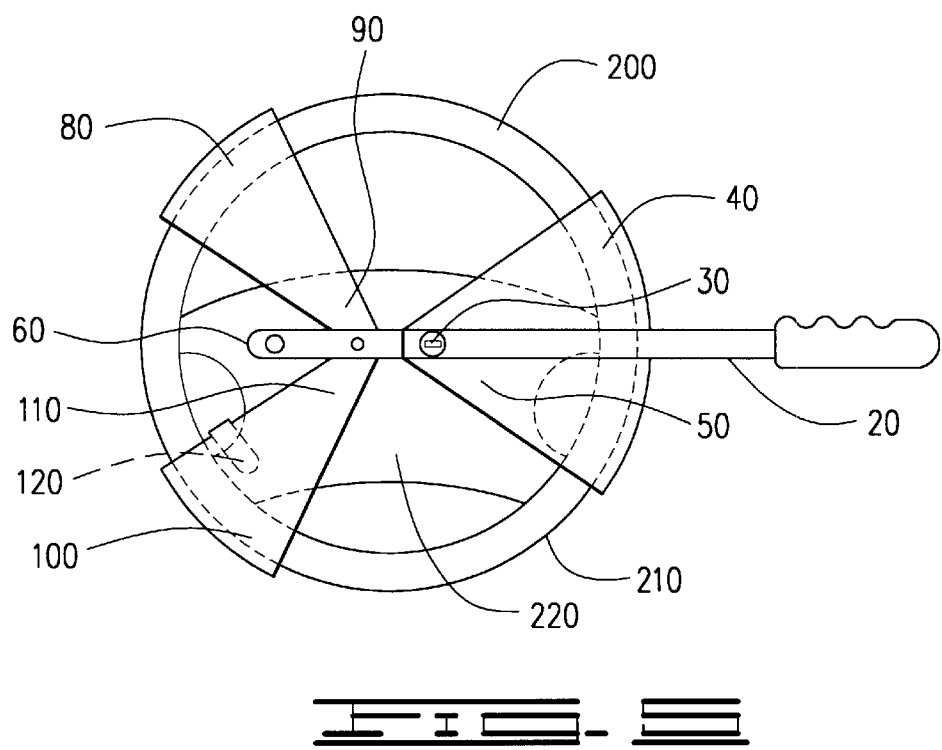
FIG. 5 is a top view of the device in a locked position in relation to a steering wheel.
Figure 6:
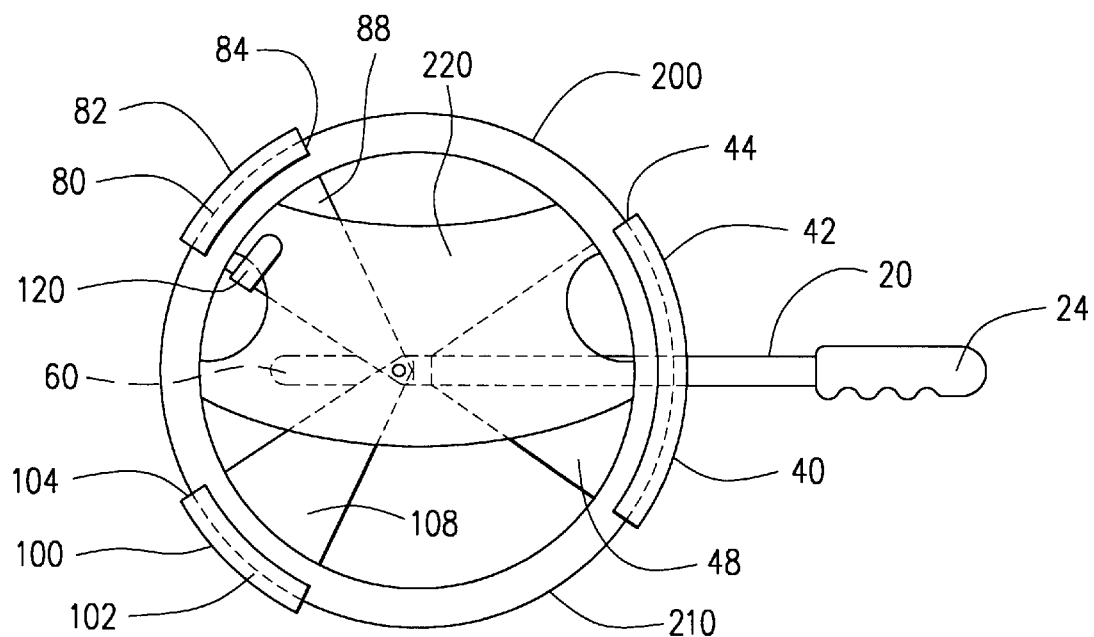
FIG. 6 is an underside view of the device in a locked position shown from below the steering wheel.

Application of the device to the steering wheel commences by disengaging the internal lock 30 and sliding the first tubular shaft 20 away from the second tubular shaft 60. The device is then placed on the steering wheel 200 with the lower surfaces 48, 88, 108 of the first, second and third steering wheel engaging fins against the steering wheel. The respective curved hook portions 44, 84, 104 of the first, second and third steering wheel fins are oriented to make contact with the steering wheel 200 at three points, such three points as far apart as possible, preferably as "three", "seven" and "eleven" positions on a clock, as shown in FIG. 4 of the drawings.

The outer threaded portion 62 of the second tubular shaft 60 is pushed into the inner receiving portion 28 of the first tubular shaft 20 until the curved hook portions 44, 84, 104 of the first, second and third steering wheel engaging fins are snug against the outer perimeter 210 of the steering wheel. The internal lock 30 is then engaged, locking the second tubular shaft 60 into the first tubular shaft 20. Once attached to the steering wheel and locked, the elongated handle 24 extends beyond the outer perimeter 210 of the steering wheel, prohibiting rotation of the steering wheel. The narrowed end 50 of the first steering wheel engaging fin, the angled ends 90, 110 of the second and third steering wheel engaging fins, the second end 26 of the first tubular shaft and the first end 62 of the second tubular shaft substantially cover the central portion 220 of the steering wheel 200 when the device is locked onto the steering wheel disallowing access to and removal of the centrally located airbag 240.

Figure 7:
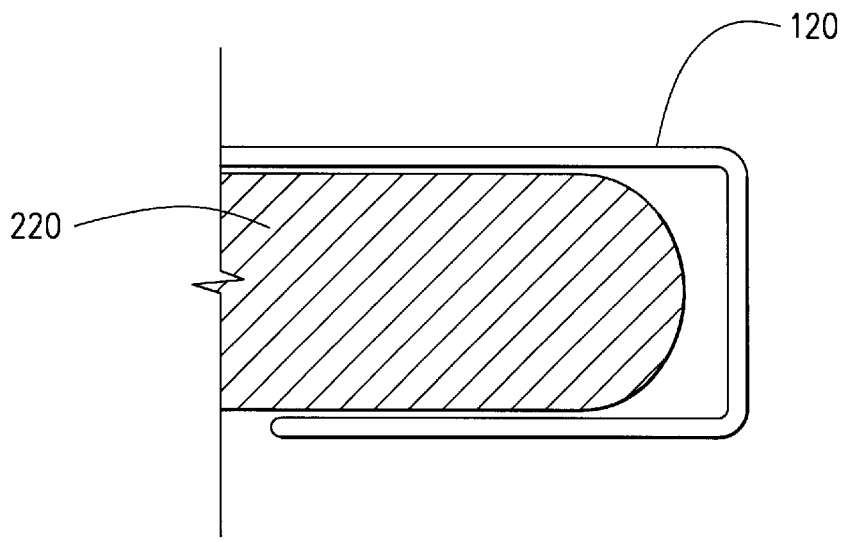
FIG. 7 is a close view of the auxiliary catch flange engaging the steering wheel.

In an embodiment of the device, as shown in FIG. 7 of the drawings, an auxiliary catch flange 120 extends from the lower surface 88 of the second steering wheel engaging fin 80, forming a crook which captures a portion of the central support 220 of the steering wheel. This auxiliary catch flange 120 provides further security in providing additional prevention of rotation of the device on the outer perimeter 210 of the steering wheel once engaged and locked on the steering wheel 200.

An additional embodiment of the device may include lining the lower surface 48, 88, 108 of the first, second and third steering wheel engaging fins, and their respective curved hook portions 44, 84, 104 with a rubberized friction enhancing material providing additional resistance to rotation of the device engaged and locked onto the steering wheel 200.

While the invention has been particularly shown and described with reference to a preferred embodiment thereof, it will be understood by those skilled in the art that changes in form and detail may be made therein without departing from the spirit and scope of the invention.

What is claimed is:

1. A device for locked attachment to an outer perimeter of an automobile steering wheel having a centrally located airbag in a central support of the steering wheel, preventing operation of the vehicle by prohibiting rotation of the steering wheel, and disallowing removal of the centrally located airbag, the device comprising:

a. a first tubular shaft attached to a triangular first steering wheel engaging fin having a curved hook portion, the tubular shaft having an inner receiving portion having an internal lock and an elongated handle extending beyond the curved hook portion of the first steering wheel engaging fin; and b. a shortened second tubular shaft having an outer threaded portion slidably engaging the inner receiving portion of the first tubular shaft, the second tubular shaft having a pivotally attached second steering wheel engaging fin having a curved hook portion and a pivotally attached third steering wheel fin having a curved hook portion, wherein such curved hook portions engage the outer perimeter of the automobile steering wheel at three locations, the curved hook portions drawn to a secure tight fit on the outer perimeter of the steering wheel by sliding the second tubular shaft into the first tubular shaft and engaging the internal lock.

2. A device for locked attachment to an outer perimeter of an automobile steering wheel having a centrally located airbag in a central support of the steering wheel, preventing operation of the vehicle by prohibiting rotation of the steering wheel, and disallowing removal of the centrally located airbag, the device comprising:

a. a first tubular shaft having a first end with an elongated handle and a second end having an inner receiving portion with an internal lock, the first tubular shaft attached to a triangular first steering wheel engaging fin having a curved hook portion;

b. a shortened second tubular shaft having a first end and a second end, the first end having an outer threaded portion slidably engaging the inner receiving portion of the first tubular shaft, the second tubular shaft having pivot hole with a pivot rivet pivotally attaching a second steering wheel engaging fin having a curved hook portion such pivot rivet also pivotally attaching a third steering wheel fin having a curved hook portion;

c. the first steering wheel engaging fin having an upper surface and a lower surface, the lower surface being the surface in contact with the steering wheel, and the upper surface permanently attached to the first tubular shaft, such first steering wheel engaging fin being triangular in shape and having a narrowed end opposing a curved edge, the curved edge including the curved hook portion contoured to the relative shape of the outer perimeter of a steering wheel, with the first steering wheel engaging fin oriented to position the curved hook portion towards the first end of the first tubular shaft with the elongated handle of the first tubular shaft projecting substantially beyond the first steering wheel engaging fin;

d. the second steering wheel engaging fin and the third steering wheel engaging fin are similar and triangular in shape, having single curved edges including the curved hook portions, contoured to the relative shape of the outer perimeter of a steering wheel, each of the second and third steering wheel engaging fins having an upper surface and a lower surface, each lower surface being the surface in contact with the steering wheel, each of the second and third steering wheel engaging fins further having an angled end, opposite the curved hook portion, such angled ends being pivotally attached to the second tubular shaft by the pivot rivet, with the respective upper surfaces of the second and third steering wheel engaging fins towards the second tubular shaft, wherein, after the device is attached and locked onto the steering wheel, the elongated handle extends beyond the outer perimeter of the steering wheel, prohibiting rotation of the steering wheel, and the first steering wheel engaging fin, the second and third steering wheel engaging fins, and the first tubular shaft and the second tubular shaft substantially cover the central portion of the steering wheel disallowing access to and removal of the centrally located airbag.

3. The device, as disclosed in claim 2, further comprising an auxiliary catch flange extending from the lower surface of the second steering wheel engaging fin, forming a crook which captures a portion of the central support of the steering wheel, this auxiliary catch flange preventing rotation of the device on the outer perimeter of the steering wheel once engaged and locked on the steering wheel.

\* \* \* \* \*